*(12)* United States Patent
Sobczak

*(10)* Patent No.: US 10,961,155 B2
*(45)* Date of Patent: Mar. 30, 2021

(54) QUICK-SETTING CONCRETE MIXTURE AND METHOD OF MANUFACTURE

(71) Applicant: Kevin James Sobczak, Denver, CO (US)

(72) Inventor: Kevin James Sobczak, Denver, CO (US)

(73) Assignee: Green Crete Solutions, LLC, Denver, CO (US)

( * ) Notice: Subject to any disclaimer, the term of this patent is extended or adjusted under 35 U.S.C. 154(b) by 0 days.

(21) Appl. No.: 16/395,667

(22) Filed: Apr. 26, 2019

(65) Prior Publication Data

US 2019/0330112 A1 Oct. 31, 2019

Related U.S. Application Data

(60) Provisional application No. 62/663,530, filed on Apr. 27, 2018.

(51) Int. Cl.

| | | |
|---|---|---|
| C04B 28/06 | (2006.01) | |
| C04B 7/32 | (2006.01) | |
| C04B 14/06 | (2006.01) | |
| C04B 40/00 | (2006.01) | |
| C04B 7/26 | (2006.01) | |
| C04B 7/52 | (2006.01) | |
| C04B 38/08 | (2006.01) | |
| C04B 18/08 | (2006.01) | |
| C04B 103/20 | (2006.01) | |
| C04B 111/20 | (2006.01) | |

(52) U.S. Cl.
CPC ............. *C04B 28/065* (2013.01); *C04B 7/26* (2013.01); *C04B 7/323* (2013.01); *C04B 7/527* (2013.01); *C04B 14/06* (2013.01); *C04B 18/08* (2013.01); *C04B 38/08* (2013.01); *C04B 40/0039* (2013.01); *C04B 2103/20* (2013.01); *C04B 2111/20* (2013.01); *C04B 2201/50* (2013.01)

(58) Field of Classification Search
CPC ........... C04B 7/26; C04B 7/323; C04B 7/527; C04B 14/06; C04B 18/08; C04B 28/065; C04B 38/08; C04B 40/0039; C04B 2103/20; C04B 2111/20; C04B 2201/50
See application file for complete search history.

(56) References Cited

U.S. PATENT DOCUMENTS

| | | |
|---|---|---|
| 6,687,559 B2 | 2/2004 | Radjy |
| 8,828,136 B2 | 9/2014 | Rice |
| 8,864,901 B2 | 10/2014 | Lloyd |
| 8,882,905 B1 | 11/2014 | Peters |
| 9,394,201 B2 | 7/2016 | Rice |
| 9,624,131 B1 * | 4/2017 | Dubey ............... E01C 7/36 |
| 9,890,082 B2 | 2/2018 | Dubey |
| 10,173,926 B2 | 1/2019 | Rice |
| 2016/0016852 A1 * | 1/2016 | Guzzetta ............ C04B 24/24 |
| | | 106/789 |
| 2016/0250775 A1 | 9/2016 | Chun |
| 2017/0174570 A1 | 6/2017 | Dubey |
| 2017/0267592 A1 | 9/2017 | Bell |

\* cited by examiner

*Primary Examiner* — Anthony J Green
(74) *Attorney, Agent, or Firm* — Critical Path IP Law, LLC (57) ABSTRACT

A quick-setting concrete mixture that uses calcium sulfoaluminate as a binder cement. In one embodiment, the disclosed concrete mixture may be prepared using a revolutionary drum mixer truck and may recycle surplus or leftover concrete. In one embodiment, the mixture may use air entrainment; such as liquid air entrainment or foam generated air entrainment, to manufacture the concrete mixture.

18 Claims, 7 Drawing Sheets

| MIX DESIGN: HEFF150 | | 1 | 2 | 3 | 4 | 5 | 6 |
|---|---|---|---|---|---|---|---|
| | SPECIFIC GRAVITY | \multicolumn{6}{c}{PROPORTION} | | | | | |
| BORAL #8 | 2.65 | 58 | 55 | | | | |
| BORAL #8 | 2.65 | | | 58 | 55 | 55 | 55 |
| BORAL SAND | 2.64 | 42 | 45 | | | 22.5 | 22.5 |
| NCC SAND | 2.58 | 0 | | 42 | 45 | 22.5 | 22.5 |
| TOTALS | | 100 | 100 | 100 | 100 | 100 | 100 |
| AIR POT VOLUME (FT³): | 0.249 | | | | | | |
| | BORAL #8 | 10837 | 10277 | 0 | 0 | 10277 | 0 |
| | BORAL #8 | 0 | 0 | 10837 | 10277 | 0 | 10277 |
| | BORAL SAND | 7848 | 8408 | 0 | 0 | 4204 | 4204 |
| | NCC SAND | 0 | 0 | 7848 | 8408 | 4204 | 4204 |
| | \multicolumn{7}{c}{MASS (G)} | | | | | | |
| | TEST 1 | 13118.0 | 13332.2 | 12435.4 | 12349.0 | 13261.7 | 12416.0 |
| | TEST 2 | 13095.0 | 13560.6 | 12532.9 | 12367.0 | 13428.7 | 12605.2 |
| | TEST 3 | 13193.6 | 13285.3 | 12419.1 | 12349.0 | 13246.8 | 12739.0 |
| | TEST 4 | 13165.0 | 13352.7 | 12439.9 | 12559.1 | 13284.6 | 12483.3 |
| | TEST 5 | 13392.0 | 13371.9 | 12499.0 | 12626.1 | 13277.7 | 12596.2 |
| | TEST 6 | 13035.5 | 13576.7 | 12624.7 | 12562.1 | 13361.0 | 12675.5 |
| | AVERAGE | 13166.5 | 13413.2 | 12491.8 | 12468.7 | 13310.1 | 12585.9 |
| LOOSE BULK DENSITY (LB/FT³) | | 116.6 | 118.8 | 110.6 | 110.4 | 117.8 | 111.4 |
| SPECIFIC GRAVITY | | 2.645 | 2.644 | 2.620 | 2.618 | 2.631 | 2.631 |
| COMPACITY | | 0.706 | 0.719 | 0.676 | 0.675 | 0.717 | 0.678 |
| POROSITY | | 0.294 | 0.281 | 0.324 | 0.325 | 0.283 | 0.322 |

QUICK-SETTING CONCRETE MIXTURE AND METHOD OF MANUFACTURE

CROSS-REFERENCE TO RELATED APPLICATION

This application is a nonprovisional patent application of and claims the benefit of U.S. Provisional Patent Application No. 62/663,530, filed Apr. 27, 2018 and titled "Quick-Setting Concrete Mixture and Method of Manufacture," the disclosure of which is hereby incorporated herein by reference in its entirety.

FIELD

The disclosure relates generally to quick-setting concrete mixtures and methods of manufacture of quick-setting concrete mixtures, and more specifically to quick-setting concrete mixtures comprising calcium sulfoaluminate cement.

BACKGROUND

Concrete mixtures traditionally require relatively long set times of several hours. If the concrete is to be paved over with a second material, for example in road construction, the delay for concrete setting can significantly increase road construction time. Furthermore, on-site surplus of traditional concrete mixtures is typically wasted. Also, typical concrete mixtures use a lime-based cement binder (aka a flowable fill), such as Portland cement. Some concrete mixtures use calcium sulfoaluminate by way of a volumetric truck, rather than a more flexible on-site revolutionary drum mixer truck. What is needed is a quick-setting concrete mixture that may be prepared using a revolutionary drum mixer truck and may recycle surplus concrete.

The disclosure solves the problems of traditional concrete mixtures by providing a quick-setting concrete mixture that uses calcium sulfoaluminate as a binder cement. The disclosed concrete mixture may be prepared using a revolutionary drum mixer truck and may recycle surplus or leftover concrete. The disclosure uses air entrainment, such as liquid air entrainment and/or foam generated air entrainment, to manufacture the disclosed concrete mixture.

Such features of the quick-setting concrete mixtures and methods of manufacture are described in greater detail below.

The term "admixture" means a material other than water, aggregate, hydraulic cement, and fiber reinforcement, used as an ingredient of concrete or mortar and added to the batch immediately before or during its mixing.

The term "aggregate" or "aggregates" means a granular material, such as sand, gravel, crushed stone, crushed hydraulic-cement concrete, or iron blast-furnace slag, used with a hydraulic cementing medium to produce either concrete or mortar.

The term "cement" means a binder substance used for construction that sets, hardens and adheres to other materials, binding them together.

The term "concrete" means a composite material composed of fine and course aggregate bonded together with a fluid cement that hardens over time.

The terms "constituent" or "constituents" mean a component part.

The phrases "concrete constituent" or "concrete constituents" mean the component parts of concrete; e.g. a conventional set of concrete constituents include concrete, water, and aggregate.

The phrase "concrete mixer" means a device that homogeneously combines cement, aggregate such as sand or gravel, and water to form concrete.

The phrase "drum mixer" or "revolutionary mixer" is a concrete mixer—that includes a drum-shaped compartment in which mixing is performed.

The phrase "Calcium Sulfoaluminate" or "CSA" is a specialty cement used in applications where high early strength and fast setting development are desired, among other things.

The phrase "specific gravity" or "SG" of a material means the unit weight of that material divided by the unit weight of water at room temperature; e.g. an aggregate with an SG of 2.50 would thus be 2.5 times as dense as water.

The phrase "particle-size distribution" or the words "PCD" or "gradation" of a powder or granular material, or particles dispersed in fluid, means a list of values or a mathematical function that defines the relative amount, typically by mass, of particles present according to size.

The phrase "water reducer" or the word "reducer" means a substance that allows concrete to be mixed with less water and/or to provide additional workability at the same water-to-cement ratio.

The word "retarder" means a substance that slows down a chemical reaction, such as slowing the hardening of a concrete mixture.

The phrase "ready mix concrete" means concrete manufactured in a factory or batching plant, according to a set recipe, and then delivered to a work site by truck mounted in—transit mixers.

The phrase "liquid air entrainment" means the entrapment of air into a substance, such as the entrapment of air into one or more constituents of a concrete mixture, using a liquid.

The phrase "foam generated air entrainment" means the entrapment of air into a substance, such as the entrapment of air into one or more constituents of a concrete mixture, using a foam.

By way of providing additional background, context, and to further satisfy the written description requirements of 35 U.S.C. § 112, the following are incorporated by reference in entirety: U.S. Pat. No. 8,864,901 to Lloyd; U.S. Pat. No. 8,882,905 to Peters; U.S. Pat. No. 890,082 to Dubey; U.S. Pat. No. 8,828,136 to Rice; U.S. Pat. No. 9,394,201 to Rice; and U.S. Pat. No. 10,173,926 to Rice; and the non-patent literature "Pore Structure of Calcium Sulfoaluminate Paste and Durability of Concrete in Freeze—Thaw Environment" by Kyle de Bruyn et al, International Journal of Concrete Structures and Materials, Vol. 11, No. 1, pp. 59-68, March 2017; Standard Practice for Selecting Proportions for Normal, Heavyweight, and Mass Concrete, ACI 211.1, American Concrete Institute; Guide for Use of Normal Weight and Heavyweight Aggregate in Concrete, 221R, American Concrete Institute; Standard Practice for Selecting Proportions for Normal, Heavyweight, and Mass Concrete, ACI 211.1, American Concrete Institute; Guide for Submittal of Concrete Proportion, ACI 211.5R-0, American Concrete Institute.

SUMMARY

The present disclosure can provide a number of advantages depending on the particular aspect, embodiment, and/or configuration.

Generally, in one embodiment, the disclosed concrete mixture utilizes Calcium Sulfoaluminate cement meeting ASTM C1600 formulated to be batched through a ready-mix concrete plant in conjunction with ASTM C-33 specified aggregates used in ready mix concrete. This is accomplished through a revolutionary drum mixer truck, batched through a standard dry batch or wet batched plant facility. Using the disclosed design methodology, the method of manufacturing the disclosed concrete mixture controls physical and hardened properties through, for example, spacing factors (e.g. paste volume/aggregate void systems), air contents, and polycarboxylates in combination with Re-Con Zero EVO.

The disclosed concrete mixture has unique characteristics. For example, typically the high early flow fill is produced through a volumetric mixer truck and not a revolutionary truck mixer. Conventional processes do not utilize air entrainment or foam generated air for freeze thaw/frost heave or utilized as a slump retention admixture. Also, the conventional processes do not promote flow fill as a high early design nor do standard Portland cement types work to achieve early strength development in flowable fill applications.

Note that Calcium Sulfoaluminate cement forms an ingredient of the geopolymer binder compositions of some embodiments of the present invention. Calcium sulfoaluminate (CSA) cements are a different class of cements from calcium aluminate cement (CAC) or calcium silicate based hydraulic cements, for example, Portland cement. CSA cements are hydraulic cements based on calcium sulfoaluminate, rather than calcium aluminates which are the basis of CAC cement or calcium silicates which are the basis of Portland cement.

In one embodiment, Citric Acid, Portland cement ASTM C150 Type I, II, V o ILA, IILA or Secondary cementitious materials class F, and C ash or slag 80, 100, 120 grade are utilized as retarder packages to retard/hydration stabilizer or slow down the set times of the high early flowable material to meet engineer specifications and overcome variable environmental and transit conditions. The disclosed concrete mixture may achieve 400-500 psi of penetration resistivity minimum strength in 1-2 hour and not to exceed 300 ps in 28 days. 7-10" slump range, and 5-10% air contents are the standard targets for physical properties. The disclosed concrete mixture achieves strengths in hours and not days.

Left over concrete or over ordered material in the revolutionary truck drum may be managed by delivery driver through utilization of the Re-Con Zero technology. This allows one to manage the high risk to the revolutionary trucks and give the supplier an opportunity to divert the load for disposal before losing or damaging the revolutionary truck drum.

In one embodiment, a concrete mixture composition is disclosed, the composition comprising: calcium sulfoaluminate; water; and aggregate; wherein: the calcium sulfoaluminate is configured as a binding agent, the calcium sulfoaluminate binding the aggregate.

In one aspect, the calcium sulfoaluminate satisfies the ASTM C1600 standard. In another aspect, the concrete mixture composition achieves at least 50 psi of penetration resistivity strength in no more than 2 hours. In another aspect, the composition further comprises a retarder. In another aspect, the retarder is citric acid. In another aspect, the aggregate is an ASTM C-33 specified aggregate. In another aspect, the aggregate is configured for use in ready mix concrete. In another aspect, the aggregate comprises sand. In another aspect, the composition further comprises a reducer material. In another aspect, the reducer material is Re-Con Zero EVO.

In another embodiment, a method of manufacturing a concrete mixture composition is disclosed, the method comprising: selecting target specifications of hardened properties of a concrete mixture composition; batching constituents of the concrete mixture composition, the constituents comprising calcium sulfoaluminate and aggregate; weighing the constituents; applying air entrainment; loading the constituents into a revolutionary drum mixer; and mixing the constituents in the revolutionary drum mixer; wherein: a concrete mixture composition is manufactured.

In one aspect, the method further comprises adding a retarder. In another aspect, the retarder is citric acid. In another aspect, the batching satisfies ASTM C-94 specification. In another aspect, the weighing satisfies ASTM C-94 specification. In another aspect, the method further comprises adding a reducer material. In another aspect, the applying air entrainment step is at least one of applying liquid air entrainment and applying foam generated air entrainment. In another aspect, the concrete mixture composition achieves at least 50 psi of penetration resistivity strength in no more than 2 hours.

In yet another embodiment, a method of manufacturing a concrete mixture composition is disclosed, the method comprising: selecting target specifications of hardened properties of a concrete mixture composition; batching constituents of the concrete mixture composition, the constituents comprising calcium sulfoaluminate and aggregate, the aggregate is at least one of an ASTM C-33 specified aggregate and sand, the batching satisfying ASTM C-94 specification; weighing the constituents, the weighing satisfying ASTM C-94 specification; applying air entrainment to the constituents; adding a retarder; loading the constituents into a revolutionary drum mixer; and mixing the constituents in the revolutionary drum mixer.

In one aspect, the applying air entrainment step is at least one of applying liquid air entrainment and applying foam generated air entrainment; and the concrete mixture composition achieves at least 50 psi of penetration resistivity strength in no more than 2 hours.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably. The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Various embodiments or portions of methods of manufacture may also or alternatively be implemented partially in software and/or firmware, e.g. calculations for concrete mixtures or proportions, measurement of densities or curing times, etc. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

It should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

The following disclosure generally relates to quick-setting concrete mixtures and methods of manufacture of quick-setting concrete mixtures. The concrete mixtures and methods of manufacture are described with respect to FIGS. 1-6.

Figure 1:
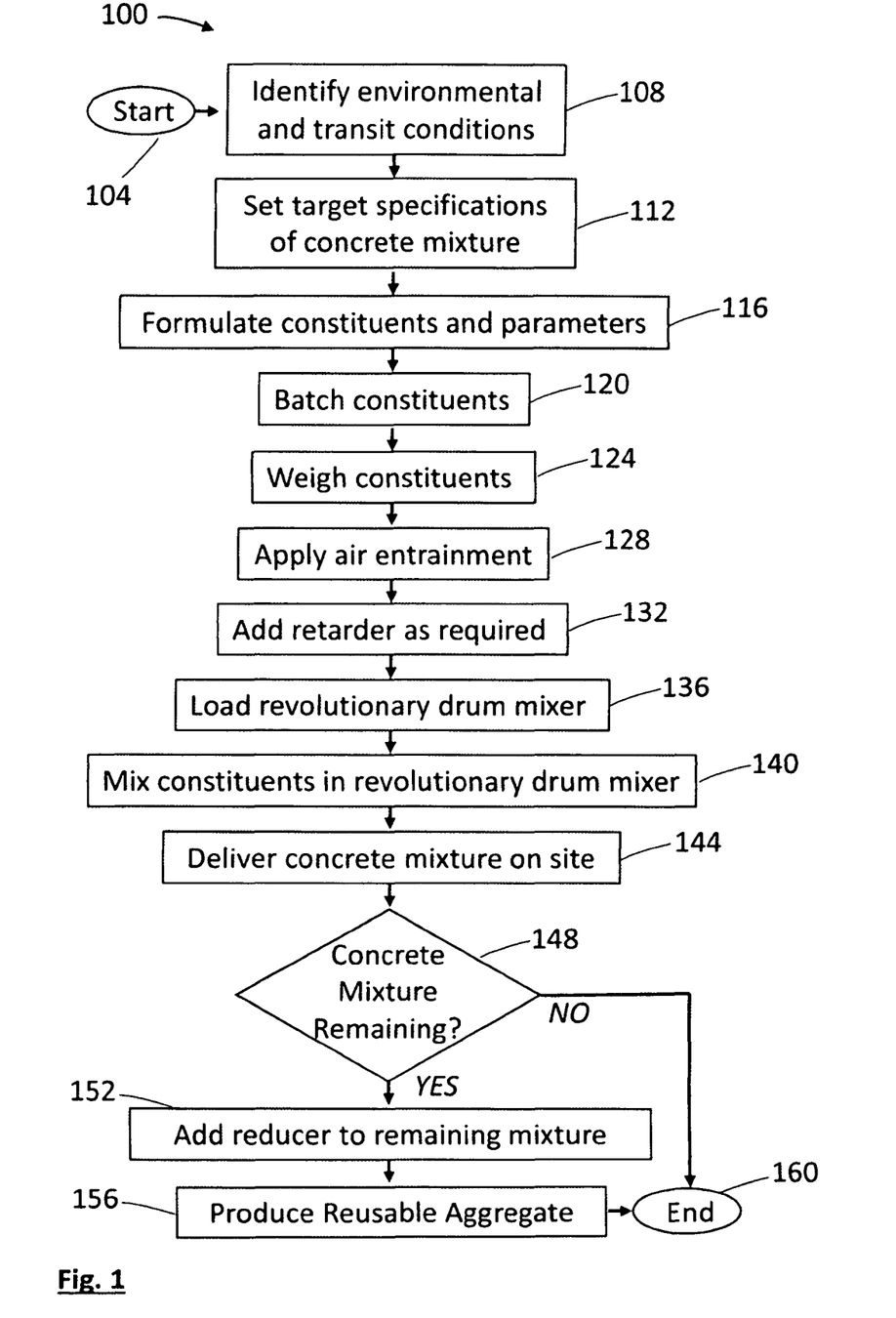
FIG. 1 shows a flowchart of a method of manufacture of a concrete mixture composition according to embodiments of the present disclosure.

With attention to FIG. 1, a flowchart of a method of manufacture 100 of a concrete mixture composition is disclosed.

The flowchart or process diagram of FIG. 1 starts at step 104 and ends at step 160. Any of the steps, functions, and operations discussed herein can be performed continuously and automatically. In some embodiments, one or more of the steps of the method of use 100, to include steps of the method 100, may comprise computer control, use of computer processors, and/or some level of automation. The steps are notionally followed in increasing numerical sequence, although, in some embodiments, some steps may be omitted, some steps added, and the steps may follow other thane increasing numerical order. When the method references a user, the user may be one or both of one or more onsite users and one or more offsite users. A user may interact or perform one or more of the described steps be using a display/GUI as described above. Note that user may be one or more individuals performing a particular step. For example, one individual may perform one or more steps of the method 100 alone or in concert with other individuals.

After starting at step 104, the method 100 proceeds to step 108, wherein the user identifies environmental and transit conditions. For example, environmental conditions, such as temperature and humidity, may affect the properties (e.g. strength) of the concrete constituents, the mixed concrete, and/or the finished concrete. Similarly, transit conditions, e.g. distance to job site, or significant change in altitude and this barometric pressure, may affect such properties. The identification of environmental and transit conditions, and any other special conditions, allows a more precise and reliable method of manufacture. After completing step 108, the method 100 proceeds to step 112.

At step 112, target specifications for the concrete mixture (aka the "product") are established. The target specifications may include strength at selected cure times, specific gravity measures, and the like. After completing step 112, the method 100 proceeds to step 116.

At step 116, the constituents and associated parameters to satisfy the concrete mixture specifications of step 112, as influenced by the environmental and transit conditions of step 108, are formulated. Stated another way, at step 116, the set of constituents are established for the targeted concrete mixture. Several sub-steps and processes may be required in step 116 and are described in more detail below with respect to FIG. 2. After completing step 116, the method 100 proceeds to step 120.

At step 120, the constituents are batched through a standard dry batch or central batch ready mix plant. In one embodiment, the constituents are batched in a manner that satisfies one or more industry standards, such as the ASTM (formerly known as American Society for Testing and Materials) "Standard Specification for Ready Mixed Concrete" aka ASTM C94 or ASTM C-94, the ASTM C685 or ASTM C-685 "Specification for Concrete Made by Volumetric Batching and Continuous Mixing", the AASHTO (American Association of State Highway and Transportation Officials) M157 or AASHTO M-157 "Specification for Concrete Made by Volumetric Batching and Continuous Mixing," or other standards known to those skilled in the art. The afore-identified standards are incorporated by reference for all purposes. After completing step 120, the method 100 proceeds to step 124.

At step 124, the constituents are weighed through a standard dry batch or central batch ready mix plant. In one embodiment, the constituents are weighed in a manner that satisfies one or more industry standards, such as the ASTM (formerly known as American Society for Testing and Materials) "Standard Specification for Ready Mixed Concrete" aka ASTM C94 or ASTM C-94, the ASTM C685 or ASTM C-685 "Specification for Concrete Made by Volumetric Batching and Continuous Mixing", the AASHTO (American Association of State Highway and Transportation Officials) M157 or AASHTO M-157 "Specification for Concrete Made by Volumetric Batching and Continuous Mixing," or other standards known to those skilled in the art. In one embodiment, all or some of materials or constituents of the product are run through the concrete plant to allow printing or recording of batch weights, such as provided to product customers. In one embodiment, the produced mix may weigh up like normal 60-70% headwater. After completing step 124, the method 100 proceeds to step 128.

At step 128, air entrainment is applied to the constituents. In one embodiment, the air entrainment admixture or foaming agent is weighed up and discharged onto the sand constituent inside an overhead scale. Air entrainment is employed to generate proper air contents, air bubble size, and spacing to aid, for example, in freeze thaw durability of exterior concretes. Liquid air entrainment or foam generated air entrainment may protect against freeze thaw or frost heave of the product line in place.

A liquid admixture is dosed (e.g. in oz/cwt aka ounce per hundredweight) to achieve the target air content of a mix design. Foam generated air is another form of a concentrate version of air entrainment but utilizes an apparatus to manufacture the air entrainment and then is pumped into the concrete during placement. The product has been shown to combat freeze thaw, but in contrast one may be using the air entrainment for slump retention properties. This assists in, for example, managing slump lose due to travel times and enables a user to control water demands onsite. After completing step 128, the method 100 proceeds to step 132.

At step 132, a retarder is applied to one or more constituents, as may be required. Generally, a retarder influences the on-set of acceleration and impacts slump retention. In one embodiment, the retarder is citric acid. The citric acid may be dosed by ambient and concrete temperatures. The citric acid may be dosed if required in the head water during the loading process into the revolutionary drum mixer. If the secondary, cementitious or the ordinary Portland cement does not have the chemistry characteristics to act as a retarder, then citric acid may provide the secondary lever to aid in the stabilization of hydration. After completing step 132, the method 100 proceeds to step 136.

At step 136, the mixture is loaded into a revolutionary drum mixer. After completing step 132, the method 100 proceeds to step 136. At step 140, the mixture is mixed in a revolutionary drum mixer. After completing step 140, the method 100 proceeds to step 140. At step 144, the mixture is delivered to the job site. After completing step 144, the method 100 proceeds to step 148.

At step 148, a query is made as to whether concrete mixture is remaining after delivery to the job site at step 144. If the response is No, the method 100 proceeds to step 160 and the method 100 ends. If the response is Yes, the method 100 proceeds to step 152.

At step 152, a reducer is added to the remaining mixture. A reducer, such as a quick-setting concrete mixture, is added to the remaining concrete left over in the revolutionary truck drum once the pour has been completed. The reducer dehydrates the cement hydration process and turns the high early concrete into an inert/reusable aggregate material. This prevents the plastic concrete inside the truck drum from entering a hardened state and converts the excess concrete into a manageable or inert state. Thus, one may return to the manufacturing plant and dispose of the concrete before the concrete damages or completely loses the revolutionary truck drum. As such, the use of a reducer as described allows ready mix suppliers to pursue the disclosed method, with a revolutionary truck drum, while reducing risk to the manufacturing company.

In one embodiment, the product Recon Zero Evo is used as the reducer. Although the main focus of the Recon Zero Evo product is for risk reduction and not necessary for the material reclaiming functionality, the product may enable material reclaiming.

Note that standard concrete with Portland cement can last in a truck for up to 4 hours due to chemistry properties and differences in the onset of hydration profiles. In contrast, the disclosure will utilize the product for risk reduction of a highly reactive cementitious material like Calcium Sulfoaluminate cement. The left-over concrete will never make it back to the plant in the conventional process. Another benefit from reducing the product from hardening in the drum is that one may recycle the material and lower the relative carbon footprint of the manufacturing process.

After completing step 152, the method 100 proceeds to step 156. At step 156, reusable aggregates may be produced and reclaimed from the revolutionary drum mixer. After completing step 152, the method 100 proceeds to step 160 wherein the method 100 ends.

Figure 2:
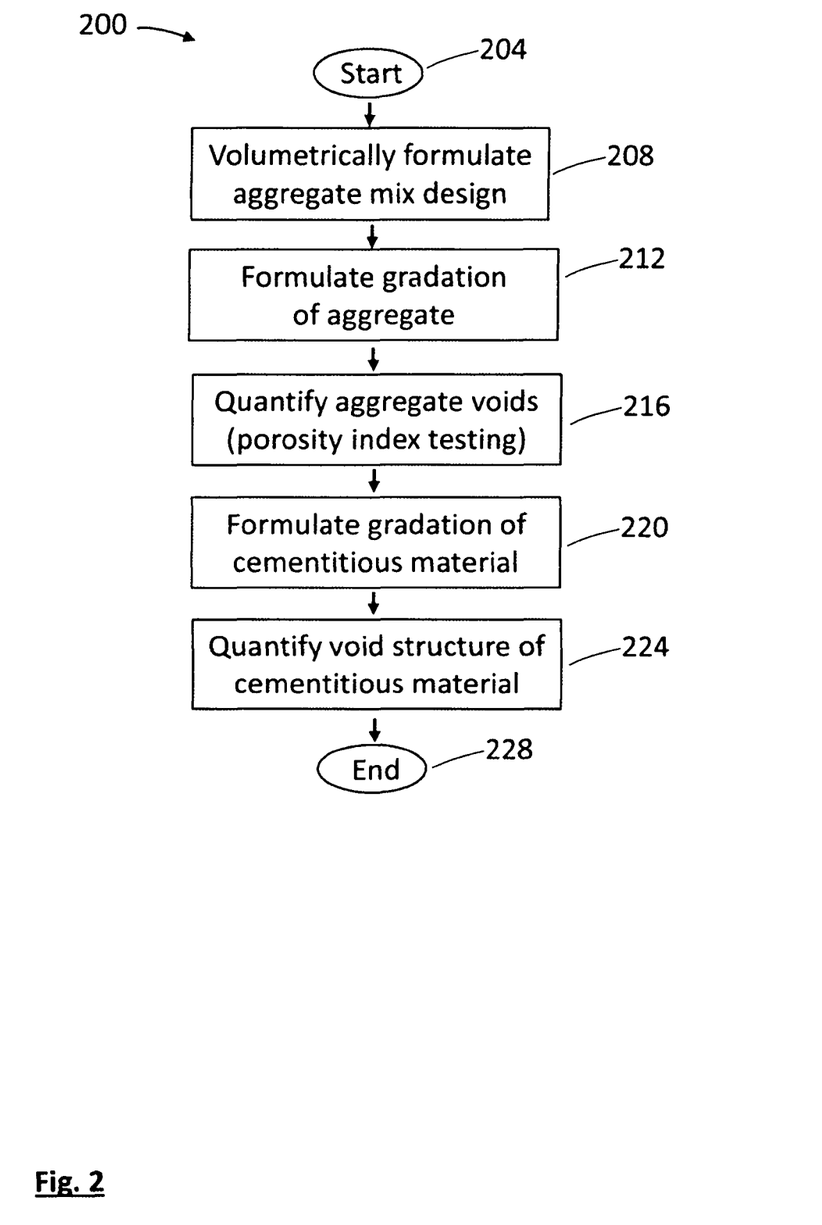
FIG. 2 shows a flowchart of a method of formulating a concrete mixture composition as a portion of the method of FIG. 1, according to embodiments of the present disclosure.

With attention to FIG. 2, a flowchart of a method 200 of formulating a concrete mixture composition is presented. The elements of the method 200 are elements of the step 116 of FIG. 1.

Generally, the steps of FIG. 2 provide a method 200 to establish the constituents and associated parameters to satisfy a given set of concrete mixture specifications, as influenced by environmental and transit conditions. Stated another way, through the disclosed method 200, one may formulate the correct admixture package, aggregate granular skeleton and spacing factor required to achieve the target specifications of hardened properties set by an engineer or other onsite. The method 200 will be described with respect to FIGS. 1 and 3-6.

The flowchart or process diagram of FIG. 2 starts at step 204 and ends at step 228. Any of the steps, functions, and operations discussed herein can be performed continuously and automatically. In some embodiments, one or more of the steps of the method of use 200, to include steps of the method 200, may comprise computer control, use of computer processors, and/or some level of automation. The steps are notionally followed in increasing numerical sequence, although, in some embodiments, some steps may be omitted, some steps added, and the steps may follow other than increasing numerical order. When the method references a user, the user may be one or both of one or more onsite users and one or more offsite users. A user may interact or perform one or more of the described steps be using a display/GUI as described above. Note that user may be one or more individuals performing a particular step. For example, one individual may perform one or more steps of the method 200 alone or in concert with other individuals.

Figure 3:
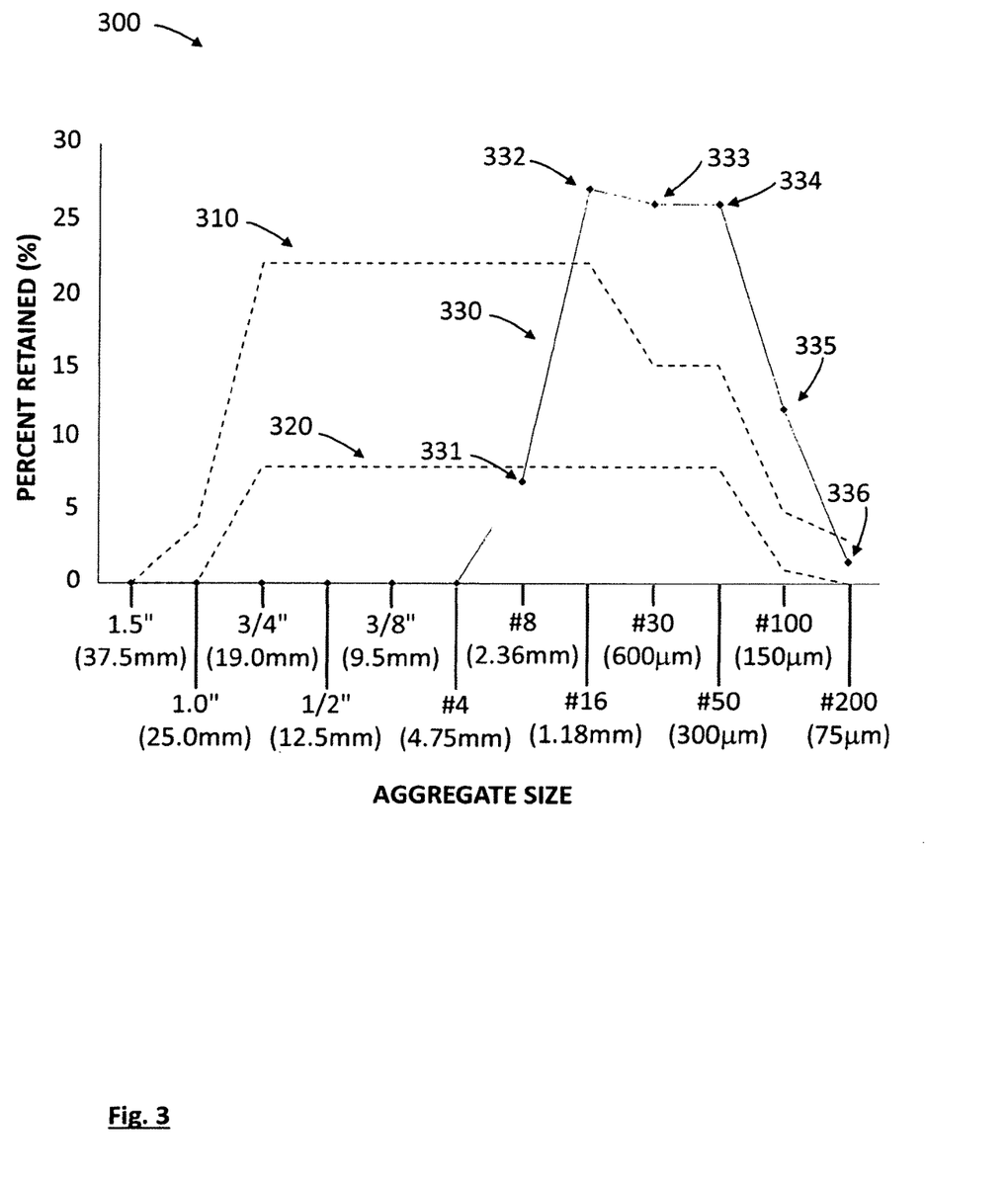
FIG. 3 shows a graph used to volumetrically formulate the aggregate mix design, as a step of the flowchart of FIG. 2.

After starting at step 204, the method 200 proceeds to step 208, where the aggregate mix design is volumetrically formulated. FIG. 3 shows a graph used to volumetrically formulate the aggregate mix design. A set of aggregates of varied sizes is selected. For each selected aggregate size, a percent retained is selected. In FIG. 3, a set of three blends of aggregates are presented: blend 310, blend 320, and blend 330. Blend 330 is composed of aggregates of size #8, #16, #30, #50, #100, and #200, respectively of approximately 7%, 26%, 26%, 27%, 12% and 2% are retained.

In one embodiment, the aggregate is an ASTM C-33 specified aggregate, as defined by the ASTM C-33 or ASTM C33 standard entitled "Standard Specification for Concrete Aggregates," incorporated by reference for all purposes.

In one embodiment, the aggregate mix design is volumetrically formulated using the ACI 211 standard of the American Concrete Institute and/or another standard known to those skilled in the art. More specifically, in one embodiment the aggregate mix design is volumetrically formulated using the ACI 211 "Standard Practice for Selecting Proportions for Normal, Heavyweight, and Mass Concrete," and/or the ACI 221R standard "Guide for Use of Normal Weight and Heavyweight Aggregate in Concrete," both of which are incorporated by reference in entirety.

Traditional aggregate mix design development does not quantify all aspects of the design. In contrast, the disclosed methodology encompasses a volumetric mix designs (e.g. the ACI 211 volumetric mix design), but also computes porosity of the granular skeleton, combined aggregate gradations, Particle Size Distribution (PSD) of cementitious, calorimetry (heat of hydration), and paste volume to void structures, some of which are described below.

After completion of step 208, the method 200 proceeds to step 212.

Figure 4:
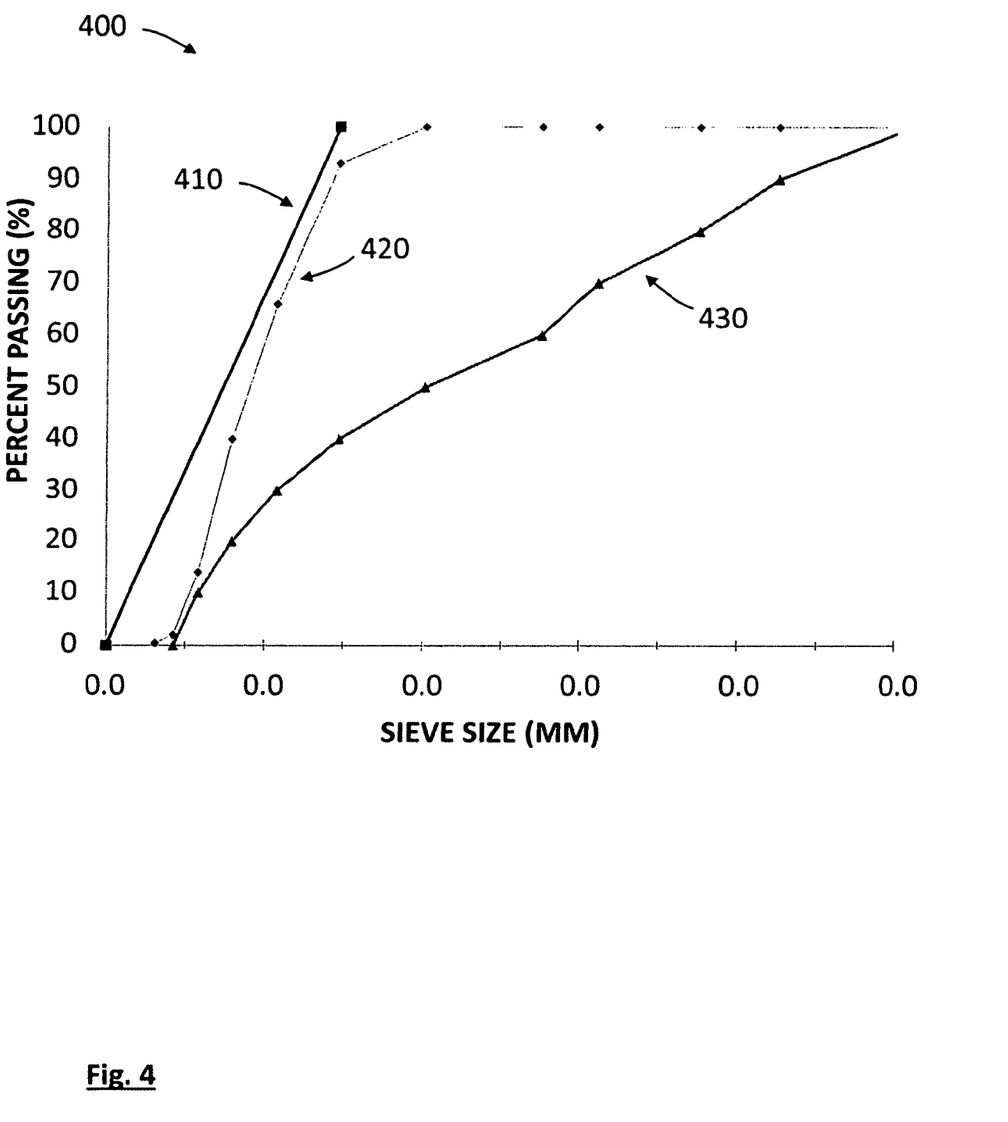
FIG. 4 shows a Power 0.45 graph used to formulate the gradation of aggregate, as a step of the flowchart of FIG. 2.

At step 212, the aggregate gradation is formulated. FIG. 4 shows a "Power 0.45" graph or curve used to formulate the gradation of aggregate. The Power 0.45 curve is utilized in the asphalt industry to help with reviewing void structure within a granular skeleton and is applied here to establish a baseline of coarse to fine aggregate ratios needed to determine aggregate particle size distribution and to perform porosity index testing.

The Power 0.45 graph presents an equation to describe a maximum density gradation for a given maximum aggregate size, as developed by Fuller and Thompson in 1907.

Generally, in a gradation and size analysis, a sample of dry aggregate of known weight is separated through a series of sieves with progressively smaller openings Once separated, the weight of particles retained on each sieve is measured and compared to the total sample weight. Particle size distribution is then expressed as a percent retained/passing by weight on each sieve size. The equation is:

$$P=(d/D)^n$$

where P=percent passing (%) i.e. aggregates finer than the particular sieve, d=aggregate size being considered, D=maximum aggregate size, n=parameter which adjusts curve for fineness or coarseness. In FIG. 4, n=0.45. Using FIG. 4, one can establish a baseline of coarse to fine aggregate ratios needed to determine aggregate particle size distribution. Line 410 is the calculated 0.45 curve per the above formula. Curves 420 and 430 are sample curves of aggregate gradation mixes.

Figure 5:
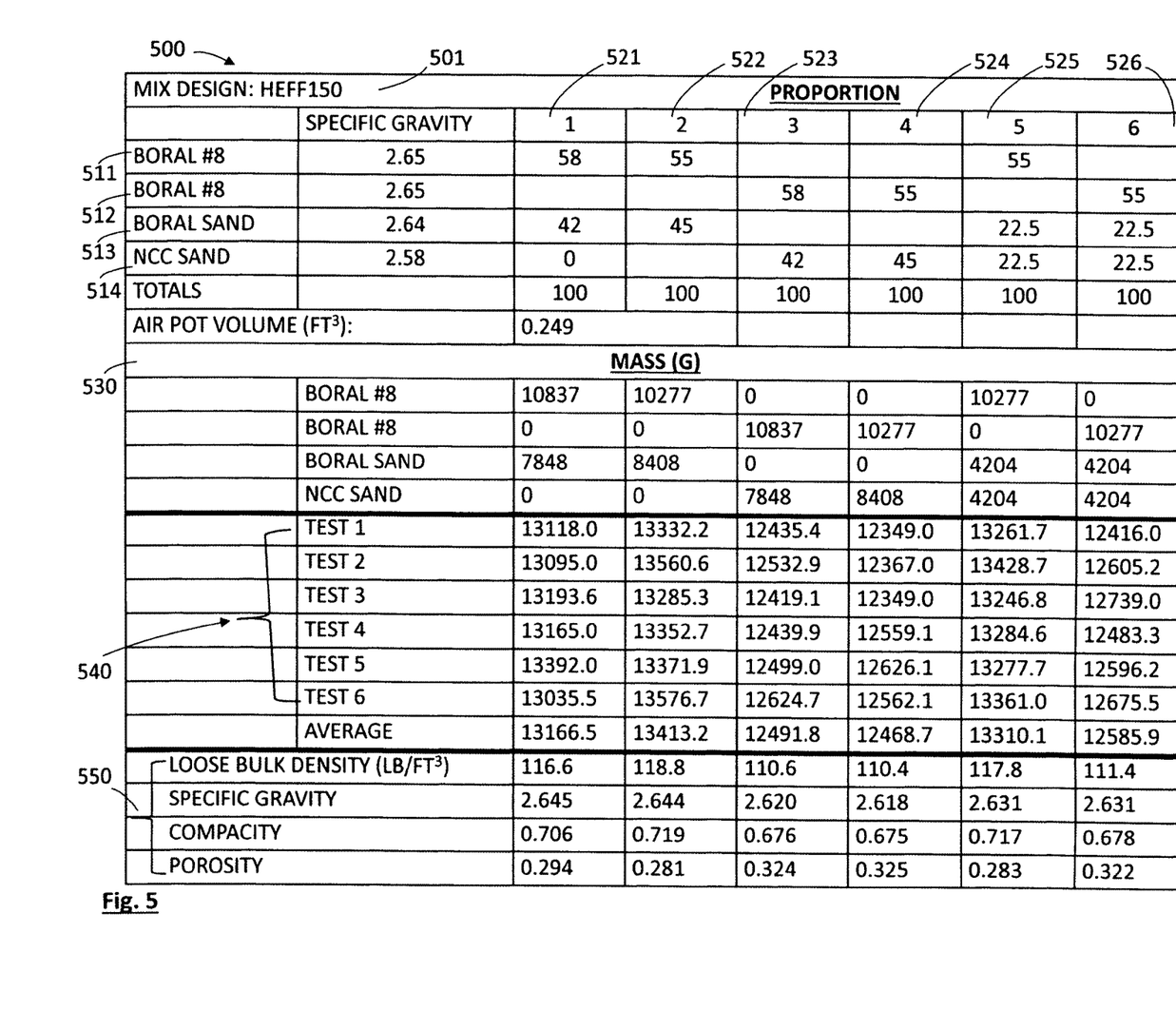
FIG. 5 shows a table of aggregate void structure quantification testing results, as a step of the flowchart of FIG. 2.

After completion of step 212, the method 200 proceeds to step 216. At step 216, the aggregate voids are quantified using a porosity index test. The goal is to have the lowest void structure in the aggregate packing, which allows one to optimize the mix design for cost, workability, etc. In describing step 212, reference will be made to FIG. 5. FIG. 5 presents a table 500 of aggregate void structure quantification testing results for a particular mix design 501. The mix design 501 comprises four aggregates: 511, 512, 513, and 514. The four aggregates are blended in six proportions: 512, 522, 523, 524, 525, and 526, resulting in mass properties in the set of mass columns 530. Testing is performed, and overall measures 550 determined.

The Porosity Index testing proceeds as follows:
1. Dry back each material in oven (i.e. oven dry condition of aggregates)
2. Use FIG. 5 to weigh up each material specified
3. Pour each sample of aggregate into a container, e.g. a wheel barrow. (As an example, proportion 521 contains 10,837 g of #8 Boral and 7,848 g of Boral sand). Mix the materials while ensuring materials are not segregated.
4. With a flat scoop, loose mean pour into a 0.25 cu/ft air bucket, once the material exceeds the height of the bucket, strike off the excess with strike off bar.
5. Weigh the bucket and report number in Test 1 section. (Continuing the same example of above step 3, Example Test 1 results in 13,118.0 g)
6. Re-run 6 times to generate average After completion of step 216, the method 200 proceeds to step 220.

Figure 6A:
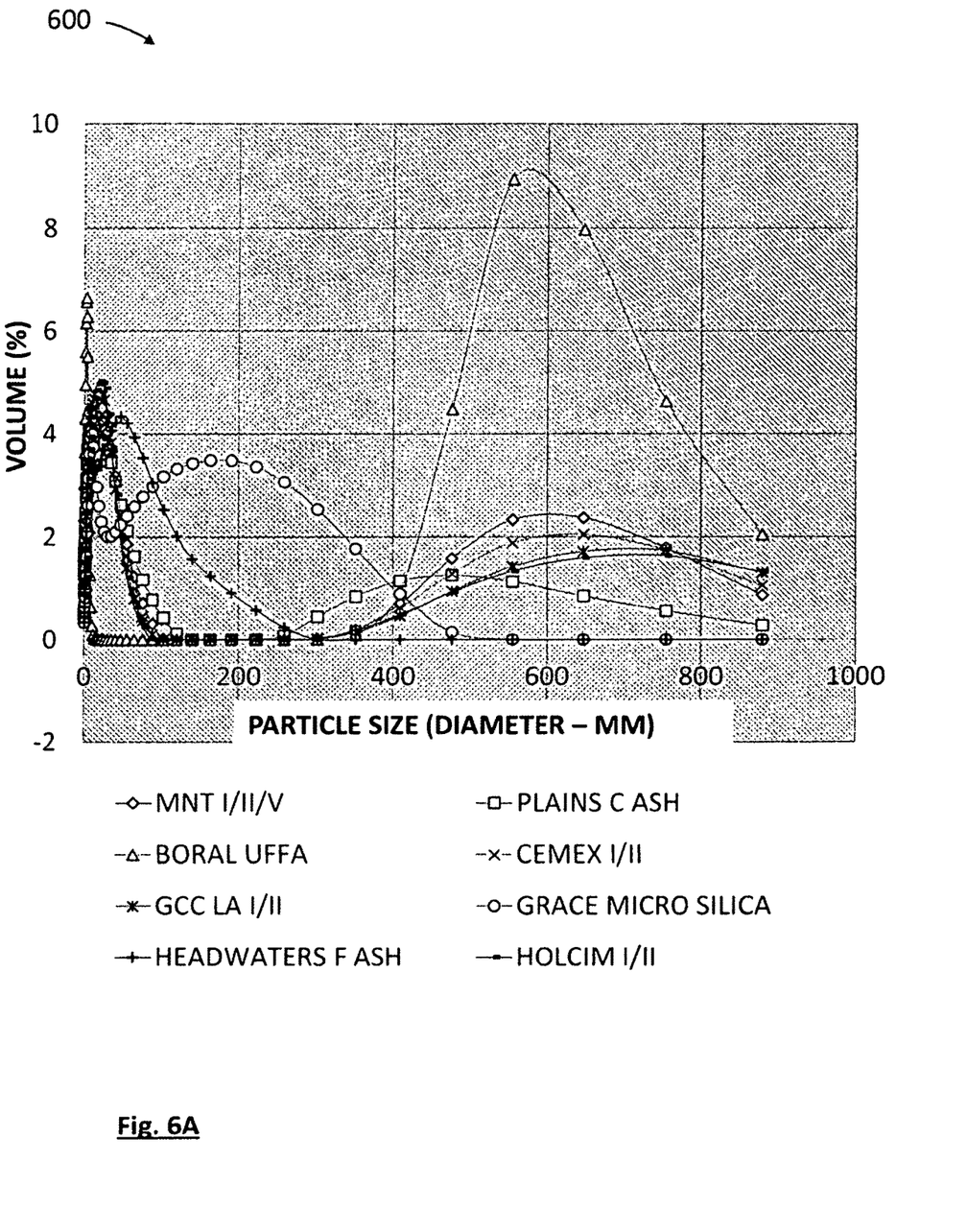
FIG. 6A shows a graph used to formulate the gradation of cementitious material, as a step of the flowchart of FIG. 2.
Figure 6B:
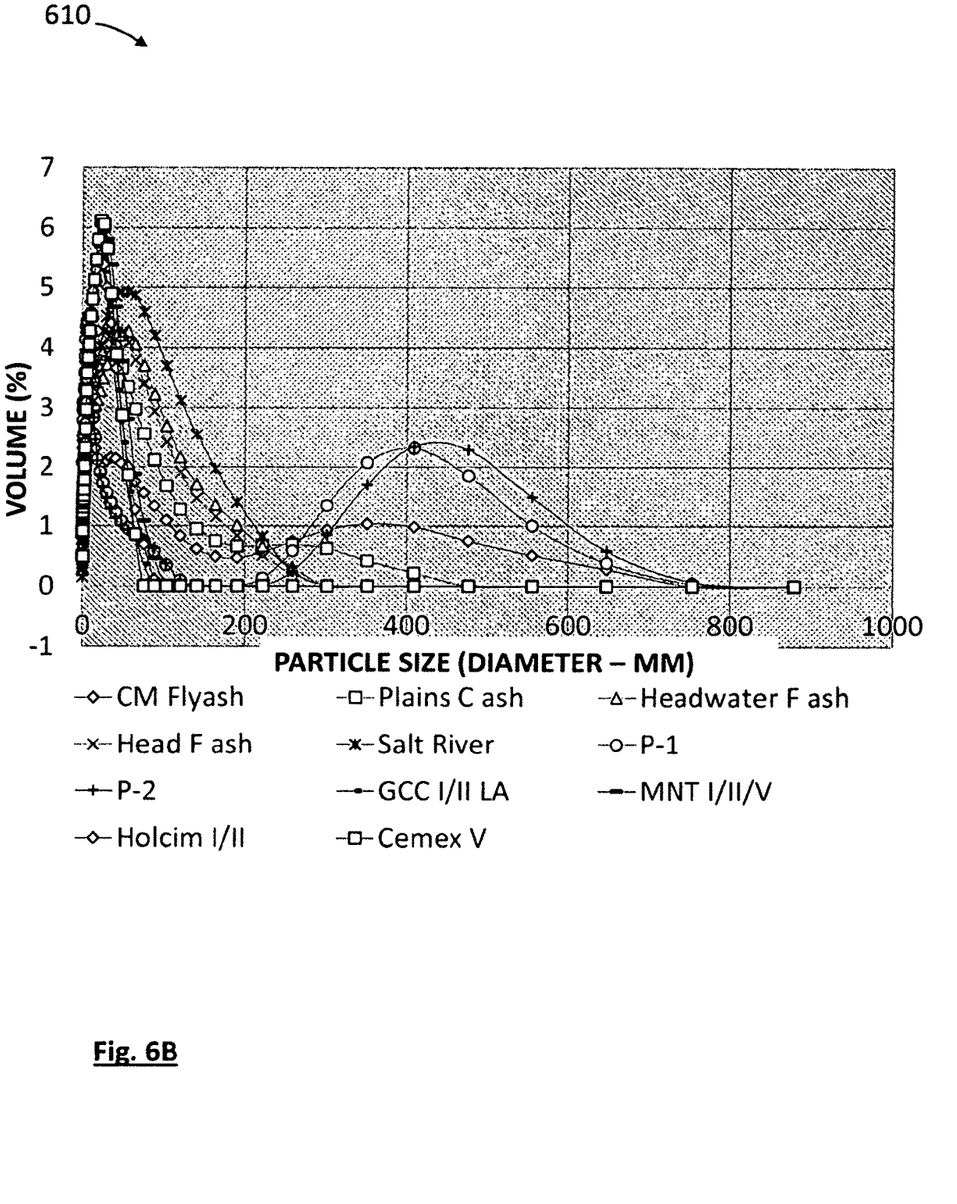
FIG. 6B shows another graph used to formulate the gradation of cementitious material, as a step of the flowchart of FIG. 2.

At step 220. The gradation of the cementitious material is formulated. FIGS. 6A-B show graphs used to formulate the gradation of cementitious material for several types of cementitious material. In FIG. 6A, a set 600 of eight (8) types of cementitious materials are plotted. For each, particle size (mm) is plotted versus percentage volume. In FIG. 6B, a set 610 of eleven (11) types of cementitious materials are plotted. Again, for each cementitious material, particle size (mm) is plotted versus percentage volume.

The gradation of the cementitious have a voids structure like the aggregates. Proportioning the different cementitious materials may be quantified through the rigden void test and allows one to quantify the void structure of selected cementitious materials and incorporate the selection into the disclosed mix design methodology.

After completion of step 220, the method 200 proceeds to step 224, where the vid structure of the cementitious material may be quantified or tested. After completion of step 224, the method 200 ends.

It should be noted that traditional approaches and mixtures do not attempt the disclosed type of application through revolutionary truck drums by a concrete ready-mix producer. The disclosure has formulated a working mix design that can achieve the target specifications and discloses how to manage the leftover concrete without adding risk to the company and adding burden to the customer onsite. In the traditional approaches and mixtures, parties only utilized volumetric truck versions to target the disclosed application. This is a significant challenge to the concrete ready-mix industry by controlling high early mix designs and the hydration process of hydraulic cement types. Concrete, once it reaches 75-90 minutes, is challenging to manage as it continues to harden inside the revolutionary truck drum. Most jobsites do not have an area for the ready-mix supplier to dispose of the leftover concrete in the supplier's truck, causing ready mix concrete suppliers to manage higher risk than standard concrete.

Standard flowable fill materials achieve 50-300 psi in 28 days. In contrast, the disclosed method may provide 400-500 psi of penetration resistivity in 1 hour. Typical flowable fill utilizes Portland Cement, Type F, C fly ash and not Calcium Sulfoaluminate cement. Traditional applications of fill material with Calcium Sulfoaluminate cement have been limited to production using volumetric trucks and not revolutionary trucks. Also, the traditional parties do not utilize the disclosed mixtures or technology with incorporation of liquid air entrainment, or foam generated air, for freeze thaw/frost heave protection, or slump retention admixture.

In one embodiment, the method of manufacture of the concrete mixture composition does not use a volumetric mixer. In one embodiment, the concrete mixture does not comprise fly ash, such as type B fly ash.

In one embodiment, the concrete sand may meter into a truck while the cementitious material is ribboning on the sand running into the truck. The HRWR and WR may be added during the addition of tail water being loaded into the truck. The mix design could utilize lager aggregate types like C33 #8, 9 or 57, 67"s and is not restricted to sand only.

In one embodiment, the Calcium Sulfoaluminate cement meets ASTM C1600 standards as defined by the ASTM C1600 standard entitled "Standard Specification for Rapid Hardening Hydraulic Cement," incorporated by reference for all purposes.

In one embodiment, lab trials may be conducted for both slump retention and air evolution, with hardened properties. The lab trial may be brought to the plant level for macro trials once physical and hardened properties have been achieved. A technical representative may manage the plant testing to select or tune the mix. Once plant trials have been completed and verified, the technical representative may provide knowledge transfer to the customer. Knowledge transfer will consist of training customer team on the levers of the mix design, controlling variables, troubleshooting the technology.

The above embodiments may, in combination or separately, may utilize computer software and/or computer hardware (to include, for example, computer-readable mediums) for any of several functions such as automated control or measurement or sensing, and furthermore may utilize one or more graphical user interfaces for human interaction with modules or elements or components.

The exemplary systems and methods of this disclosure have been described in relation to quick-setting concrete mixtures. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the methods have been discussed and illustrated in relation to a particular sequence of events, it should be appreciated that changes, additions, and omissions to this sequence can occur without materially affecting the operation of the disclosed embodiments, configuration, and aspects. A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion, has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The compositions, materials, and methods of the appended claims are not limited in scope by the specific compositions, materials, and methods described herein, which are intended as illustrations of a few aspects of the claims and any compositions, materials, and methods that are functionally equivalent are intended to fall within the scope of the claims. Various modifications of the compositions, materials, and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising", and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed.

What is claimed is:

1. A method of manufacturing a quick-setting concrete, the method comprising:
   setting specifications of the quick-setting concrete;
   selecting constituents of the quick-setting concrete to satisfy the specifications, the constituents comprising a cement constituent and an aggregate mix constituent;
   formulating the aggregate mix constituent to satisfy the specifications to include quantifying aggregate voids;
   formulating the cement constituent to satisfy the specifications to include formulating a gradation of the cement constituent;
   batching the constituents;
   weighing the constituents;
   applying air entrainment to the constituents; and
   mixing the constituents; wherein:
   the cement constituent is a calcium sulfoaluminate;
   the gradation of the cement of constituent is quantified using a rigden voids test; and
   the quick-setting concrete is manufactured.

2. The method of claim 1, wherein the mixing is performed in a revolutionary drum mixer.

3. The method of claim 1, wherein the air entrainment is performed using a liquid admixture, the liquid admixture dosed to satisfy an air content specification.

4. The method of claim 1, wherein the calcium sulfoaluminate satisfies ASTM CS 600 standard.

5. The method of claim 1, wherein the applying air entrainment step is applying foam generated air entrainment.

6. The method of claim 1, wherein the concrete mixture composition achieves at least 400 psi of penetration resistivity strength in no more than 2 hours.

7. The method of claim 1, further comprising the step of recycling at least some of the quick-setting concrete, wherein at least some of the aggregate mix constituent is recovered.

8. The method of claim 7, further comprising the step of adding a retarder to the constituents, the retarder comprising citric acid.

9. The method of claim 8, wherein the formulating the aggregate mix constituent to satisfy the specifications step further comprises: i) quantifying aggregate voids using porosity index testing; ii) computing at least one of a porosity of a granular skeleton and a heat of hydration; and iii) computing a paste volume to void structures.

10. A method of manufacturing a quick-setting concrete, the method comprising:
    setting specifications of the quick-setting concrete;
    selecting constituents of the quick-setting concrete to satisfy the specifications, the constituents comprising a cement constituent and an aggregate mix constituent;
    formulating the aggregate mix constituent to satisfy the specifications to include quantifying aggregate voids;
    formulating the cement constituent to satisfy the specifications to include formulating a gradation of the cement constituent;
    batching the constituents;
    weighing the constituents;
    applying foam generated air entrainment to the constituents; and
    mixing the constituents; wherein:
    the cement constituent is a calcium sulfoaluminate; and
    the quick-setting concrete is manufactured.

11. The method of claim 10, wherein the mixing is performed in a revolutionary drum mixer.

12. The method of claim 10, wherein the air entrainment is performed using a liquid admixture, the liquid admixture dosed to satisfy an air content specification.

13. The method of claim 10, wherein the gradation of the cement constituent is quantified using a rigden voids test.

14. The method of claim 10, wherein the calcium sulfoaluminate satisfies ASTM CS 600 standard.

15. The method of claim 10, wherein the concrete mixture composition achieves at least 400 psi of penetration resistivity strength in no more than 2 hours.

16. The method of claim 10, further comprising the step of recycling at least some of the quick-setting concrete, wherein at least some of the aggregate mix constituent is recovered.

17. The method of claim 10, further comprising the step of adding a retarder to the constituents, the retarder comprising citric acid.

18. A method of manufacturing a quick-setting concrete, the method comprising:
    setting specifications of the quick-setting concrete;
    selecting constituents of the quick-setting concrete to satisfy the specifications, the constituents comprising a cement constituent and an aggregate mix constituent, the cement constituent a calcium sulfoaluminate;

formulating the aggregate mix constituent to satisfy the specifications, the formulating comprising: i) quantifying aggregate voids using porosity index testing; ii) computing at least one of a porosity of a granular skeleton and a heat of hydration; and iii) computing a paste volume to void structures;

formulating the cement constituent to satisfy the specifications to include formulating a gradation of the cement constituent;

batching the constituents;

weighing the constituents;

applying air entrainment to the constituents; and adding a retarder to the constituents, the retarder comprising citric acid;

mixing the constituents, wherein the quick-setting concrete is manufactured; and recycling at least some of the quick-setting concrete, wherein at least some of the aggregate mix constituent is recovered.

* * * * *